United States Patent [19]
Hale et al.

[11] Patent Number: 5,297,258
[45] Date of Patent: Mar. 22, 1994

[54] DATA LOGGING FOR HARD DISK DATA STORAGE SYSTEMS

[75] Inventors: Robert P. Hale; Robert J. Beard, both of Irvine, Calif.

[73] Assignee: AST Research, Inc., Irvine, Calif.

[21] Appl. No.: 795,682

[22] Filed: Nov. 21, 1991

[51] Int. Cl.$^5$ ............................................... G06F 13/00
[52] U.S. Cl. .............................. 395/275; 364/DIG. 1; 364/238.3; 364/238.4; 364/236.2; 364/248.1; 364/239.7; 364/284.2
[58] Field of Search ............... 395/575, 425, 700, 650, 395/275; 360/48; 369/54

[56] References Cited

U.S. PATENT DOCUMENTS

| | | | |
|---|---|---|---|
| 4,467,421 | 8/1984 | White | 395/425 |
| 4,489,378 | 12/1984 | Dixon et al. | 395/425 |
| 4,839,745 | 6/1989 | Tindall | 358/336 |
| 4,979,054 | 12/1990 | McCullough et al. | 360/48 |
| 5,040,111 | 8/1991 | Al-Salemeth et al | 395/575 |
| 5,088,081 | 2/1992 | Farr | 369/54 |

Primary Examiner—Thomas M. Heckler
Attorney, Agent, or Firm—Knobbe, Martens, Olson & Bear

[57] ABSTRACT

A data log for use with conventional hard disk subsystems or other data storage subsystems provides a system to minimize delays caused in a computer system due to the input/output systems, such as hard disks. The data log is preferably one or more hard disks, or any other non-volatile data storage device. Preferably, when the operating system requests a write to the hard disk subsystem, a hard disk controller directs the data to the data log rather than the hard disks. Then, when I/O requests are at a lull, the hard disk controller moves the data from the data log to the hard disk subsystem. Because the data is written to the data log sequentially, the hard disk controller completes the write operation quickly. This minimizes any bottleneck created while the system waits for the completion of the write operation.

13 Claims, 3 Drawing Sheets

DATA LOGGING FOR HARD DISK DATA STORAGE SYSTEMS

BACKGROUND OF THE INVENTION

1. Field of the Invention

The present invention relates to minimizing the delays in a computer system caused by an input/output (I/O) bottleneck. Specifically, the present invention involves a data logging system for use with hard disk subsystems to relieve the bottleneck caused by the hard disk subsystem in many computer operating environments.

2. Description of the Related Art

For many years, the central processing unit (CPU) in a computer has been the main component limiting the speed of operations carried out by the computer. However, very fast processors (e.g., the INTEL 80386 and INTEL 80486) and highspeed dynamic random access memory (DRAMs) have become available at prices acceptable to personnel computer users. Moreover, the rise in popularity of personnel computers has led to higher capacity hard disk subsystems at a lower price. Unfortunately, the average hard disk subsystems are not significantly faster than previously existing subsystems. Accordingly, the hard disk subsystem is often the source of the main bottleneck in many operating environments.

A variety of solutions for improving the speed of I/O in hard disk operations have been attempted with varying degrees of success. Solutions such as the Extended Industry Standard Architecture (EISA) and Multi-Channel Architecture (MCA) improve overall system performance. High speed hard disk adapters (controllers) using architectures such as the Small Computer Systems Interface (SCSI) are also popular. However, these bus architectures and controllers are still limited in speed by the hard disk subsystem (i.e., the access times of the hard disks).

The most popular improvement in I/O performance involves the use of a cache managed at the operating system level. Caching at the controller level is also popular. Caching is a relatively inexpensive method to improve system performance. Analysis has shown that caching at the operating system level is better than caching at the controller level, and caching at both levels performs worse than either alone. Even with caching, the bottleneck remains the hard disk subsystem in most operating environments.

Disk reorganizers are also popular for improving I/O speed. These utilities typically move portions of files spread throughout a hard disk to make individual files contiguous on the hard disk to reduce disk access times. However, the effects of a reorganization on a hard disk are temporary, and many reorganization utilities use shortsighted algorithms.

Larger computer systems often use several disks which are configured to act as a single disk (a disk array) with data striped across the disks. A striped array speeds disk access times, as well known in the art. However, when multiple disks are used as a single disk, the reliability decreases because the failure of one disk often causes a loss of a significant portion of data from most or all of the files on the array.

To solve this reliability problem, researchers at the University of California at Berkeley proposed five logical disk geometries (LDGs) they termed a "Redundant Array of Inexpensive Disks" (RAID). For the purposes of this application, RAID 4 and RAID 5 are the most relevant LDGs. RAID 4 and RAID 5 involve logical disk geometries where a number of data disks in the hard disk subsystem are striped along boundaries of a selected size, as well known in the art. In RAID 4, one disk is used for parity, and in RAID 5 the parity is distributed throughout the subsystem rather than being placed on one disk. The parity defined in RAID 4 and RAID 5 is the exclusive-OR of the data on corresponding striped blocks of the other disks in the hard disk subsystem, as well known in the art.

However, even with a RAID 5 subsystem, the bottleneck may remain in the hard disk subsystem because the improvement provided by RAID logical disk geometries is limited by the read-to-write ratio. With the RAID configuration, a write takes much longer to complete than a read because with every write, the parity must also be updated. If the read-to-write ratio approaches 1:1 or even 1.5:1, the RAID 5 architecture generally performs significantly worse than a single hard disk.

If no cache is used, the read-to-write ratio is often about 3:1, which results in a speed improvement using RAID 5. However, if a cache is used, the read-to-write ratio often approaches 1:1 or 1.5:1, and a RAID subsystem may perform significantly worse than a single hard disk.

Accordingly, without significant increases in I/O performance and reliability combined, high-performance computers remain limited in performance by I/O.

SUMMARY OF THE INVENTION

It would be advantageous to minimize or eliminate the I/O bottleneck currently limiting the performance of high performance computers. It would be further advantageous to utilize the reliability provided by RAID systems, and also relieve the bottleneck created in such systems by write operations.

The present invention involves a method and apparatus for minimizing the bottleneck created in hard disk subsystems. The present invention is particularly advantageous for use with RAID 4 or RAID 5 disk systems, but also provides improved performance for other hard disk subsystems, including systems with a single hard disk. More particularly, the present invention involves providing a data logging system to reduce the time required to write data to the hard disk subsystem. According to the present invention, data to be written to the hard disk subsystem is temporarily stored in a "log" which uses disk space, non-volatile RAM or any non-volatile storage medium in a linear (i.e., sequential) fashion.

In a typical operating environment, the operating system (O/S) requests a write to the hard disk subsystem and provides the hard disk subsystem destination address for the data. According to the present invention, when the operating system requests a write to the hard disk subsystem, the data, along with the destination address, is initially stored in the data log sequentially rather than in the hard disk subsystem at the destination address. Storing the data sequentially requires significantly less disk access time than storing the data at various locations on a hard disk as requested by the operating system. Then, when I/O operations become less frequent, and if the data in the log has not been overwritten, the data from the log is moved from the temporary data log to the hard disk subsystem at the appropriate destination address. Accordingly, "lull time" is used to move data from the log to the hard disk subsystem. This minimizes or alleviates the bottleneck created by I/O and is particularly useful in minimizing the bottleneck created by write operations to a RAID hard disk subsystem.

In one embodiment, two log disks may be used in a mirroring fashion in order to enhance the reliability of the data log. In another embodiment, the data log may include a special purpose cache configured at the hard disk controller level along with one or more log disks. Preferably, the data log includes information in a header at the beginning of any block of data indicating where the data should be located on the hard disk subsystem. The data in the header increases the reliability of the system in the event that a crash occurs before data in the data log is transferred to the hard disk subsystem. Preferably, the headers are not generally utilized during normal operation since this information can be stored in the special purpose cache.

One aspect of the present invention involves an improved hard disk system for use in a computer having an operating system. The hard disk system has a hard disk controller, a hard disk subsystem having at least two hard disks, and a data log which temporarily stores data from consecutive write operations directed to the hard disk subsystem. The data is later moved from the data log to the hard disk subsystem. Moreover, the data is stored sequentially in the data log. The hard disk subsystem may comprise any conventional storage subsystem. Disk arrays such as RAID 4 and RAID 5 benefit significantly from the data log system.

In one embodiment of the present invention, the data log comprises a single hard disk. In another embodiment of the present invention, the data log comprises non-volatile random access memory. In yet another embodiment, the data log comprises a first hard disk and a second hard disk, wherein the second hard disk provides mirroring for the first hard disk. In still another embodiment, the data log comprises a first hard disk, a second hard disk, and a special purpose cache configured in a memory of the hard disk controller, wherein the second hard disk provides delayed mirroring for the first hard disk.

Another aspect of the present invention involves a method of temporarily logging data intended for a conventional hard disk array, wherein the conventional hard disk array is used in a computer with a conventional operating system. The method involves providing a data log for use with the conventional hard disk array, and providing a hard disk controller for the conventional hard disk array and the data log. During operation, when the operating system issues a request to the hard disk controller to write data to the conventional hard disk array, the hard disk controller writes the data to the data log and indicates to the operating system that the write is complete. Then, the controller waits for a decrease in the frequency of occurrence of read and write requests by the operating system. When the frequency of requests slows down, the controller transfers the data from the data log to the conventional hard disk array.

In one embodiment, writing the data to the data log involves writing the data to a special purpose cache configured in a memory on the hard disk controller, and writing the data to a first hard disk drive in the data log.

In another embodiment of the present invention, the hard disk controller has a special purpose cache configured in a memory. In this embodiment, writing the data to the data log involves writing the data to a first hard disk drive in the data log, determining if the special purpose cache is full, and, if the cache is full, moving a selected portion of the data from the cache to a second hard disk drive in the data log, and finally, writing the data to the cache.

DETAILED DESCRIPTION OF THE PREFERRED EMBODIMENT

Hard Disk Subsystem Controller

Figure 1:
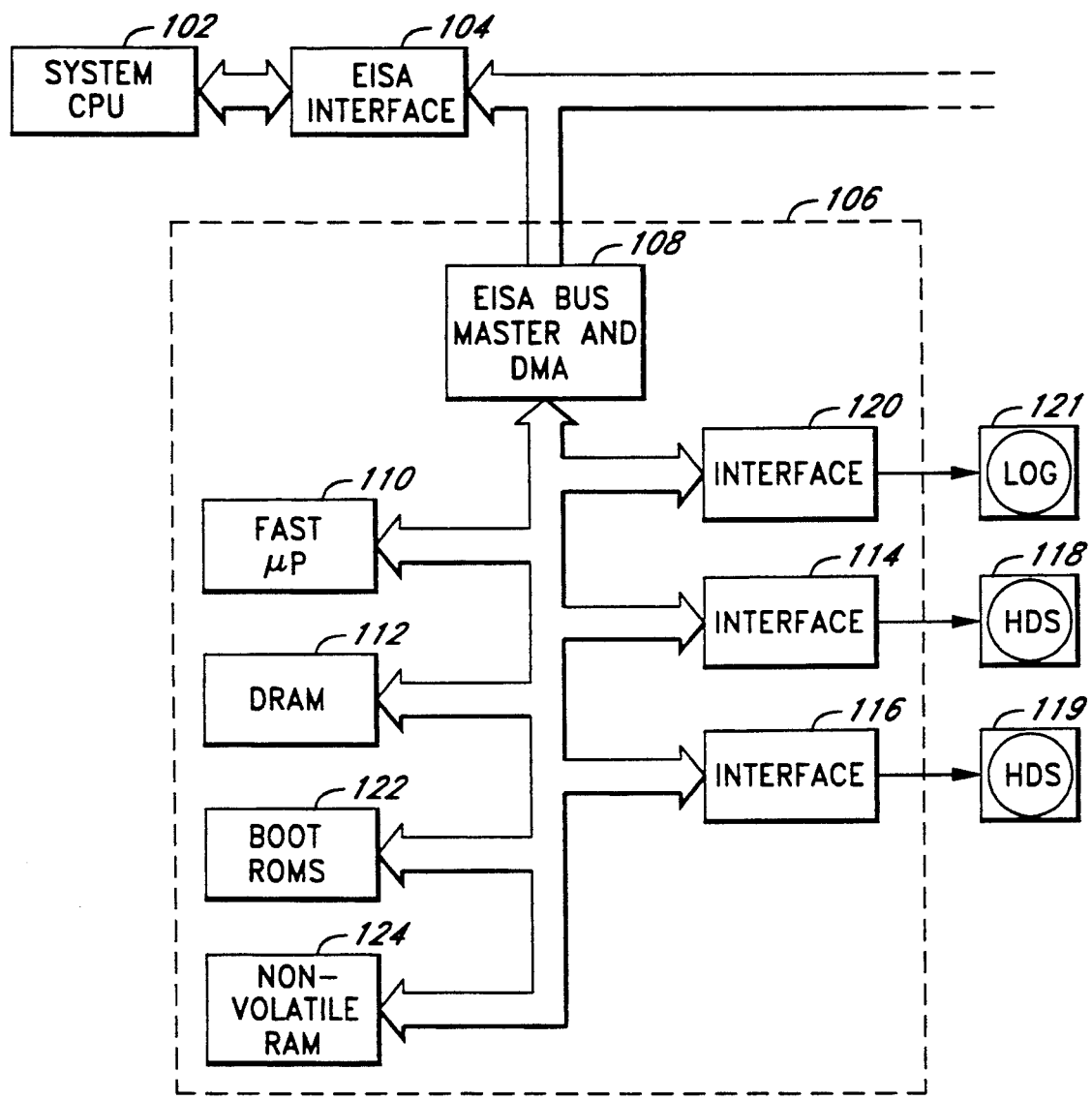
FIG. 1 depicts a block diagram of an exemplary computer system according to the present invention.

FIG. 1 illustrates an exemplary computer system 100 with a system central processing unit (CPU) 102, an EISA bus interface 104, and a hard disk controller 106 according to the present invention. Advantageously, the hard disk controller 106 comprises a conventional EISA bus master interface 108 with direct memory access (DMA), a fast microprocessor 110 (e.g., an INTEL 80486 or AMD 29000), a Dynamic Random Access Memory (DRAM) 112, two hard disk interface channels 114, 116 connected to hard disk subsystems 118, 119, a hard disk interface 120 connected to a data log 121, boot Read Only Memories (ROMs) 122, and a nonvolatile RAM 124. In one embodiment, the EISA bus interface 108 comprises an INTEL 82355 Bus Master Interface Controller, as described in Intel, *Peripheral Components* 1991, Intel: Santa Clara, Calif., 1991. In the present embodiment, the hard disk interface channels 114, 116 comprise SCSI channels as well known in the art, and the hard disk interface 120 comprises a conventional integrated drive electronics (IDE) interface, as well known in the art. In another embodiment, the interface 120 comprises an SCSI interface. In yet another embodiment, the interface channels 114, 116 comprise IDE interfaces. Any other similar hard disk interface is also appropriate.

In a preferred embodiment of the present invention, the boot ROMs 122 comprise an EISA bus compatible boot ROM, as well known in the art, and a hard disk controller (HDC) boot ROM with boot instructions for the fast microprocessor 110 and potentially with disk geometry software for the hard disk subsystems 118, 119. Preferably, the EISA bus compatible boot ROM is accessible by the system CPU 102.

In an alternative embodiment, the disk geometry software is stored on a few sectors of the hard disks in the hard disk subsystems 118, 119. This software is downloaded to the RAM 112 during initialization operations. Advantageously, the hard disk controller 106 hides the boot sectors from the operating system by simply adding the size of these sectors to any disk request. Storing the disk geometry software on the hard disks rather than in the HDC boot ROM decreases the necessary size of the HDC boot ROM and simplifies updates because the disk geometry software is stored on the disks rather than in a ROM. Additionally, in a more preferred embodiment, the disk geometry software is stored on all of the hard disks in the hard disk subsystems 118, 119 to increase reliability.

Preferably, the DRAM 112 comprises one megabyte (a common increment as well known in the art) of DRAM for use in the hard disk controller 106, and the nonvolatile RAM 124 comprises 8 Kbytes of flash or battery backed up RAM. In a preferred embodiment, the DRAM 112 is not used as a general cache, but may be used to provide a special purpose cache as further described herein.

Advantageously, the present embodiment provides two SCSI channels as seen in FIG. 1 for use with conventional disk arrays. Each SCSI channel handles up to seven physical hard disk units, as well known in the art. Because disk arrays with more than seven disks are often used in current systems, two SCSI channels are provided which allow for up to 14 physical disk units. This is sufficient for addressing about 12 gigabytes using RAID 5 with currently available hard disks, with additional capacity as hard disk units increase in capacity. Moreover, a hard disk controller similar to the hard disk controller 106 shown in FIG. 1 could support several SCSI channels. Preferably, the hard disk controller 106 may make all of the hard disks that it controls appear as one or more hard disks to the operating system, as well known in the art.

Desirably, the hard disk drives used in the hard disk subsystems 118, 119 support conventional SCSI "connect" and "disconnect" operations. As well understood in the art, this allows for multiple outstanding requests on the same bus, in that each device connected to the interface has the capability of receiving a request, and then releasing the bus while processing the request. While one device is processing one request, another request can be issued on the bus to another device.

The hard disk subsystems 118, 119 may comprise any hard disk subsystem (e.g., a single hard disk unit, an array of striped disks, an array of mirrored disks, an array of striped and mirrored disks, or a RAID subsystem) or any other storage device known in the art.

Figure 2:
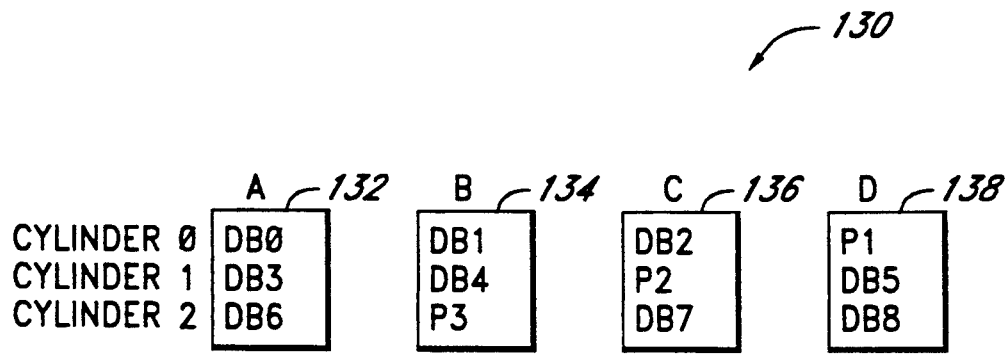
FIG. 2 illustrates a symbolic diagram of a RAID 5 hard disk subsystem with data and parity striped across four hard disks.

FIG. 2 depicts a symbolic representation of a RAID 5 hard disk subsystem 130 with four hard disks—disk A 132, disk B 134, disk C 136 and disk D 138. This hard disk subsystem 130 is chosen for explanation because of the reliability of this subsystem, and because of the large potential for improvement in performance by elimination of the bottleneck resulting from write operations.

In FIG. 2, the data is shown striped in blocks across the four hard disks 132, 134, 136 and 138. Data blocks are labelled as "DB" in the figure. For purposes of discussion, the rows depicted in the hard disks in FIG. 2 represent cylinders of the hard disks, as well known in the art. For simplicity, only three cylinders—cylinder 0, cylinder 1 and cylinder 2—are depicted.

In the RAID 5 algorithm, the parity stored at cylinder 0 of hard disk drive D 138, designated as P1, is the result of exclusive-ORing of the data blocks at cylinder 0 of the other disk drives—data block DB0 on drive A 132, with data block DB1 on drive B 134, and with data block DB2 on drive C 136.

Similarly, the parity on cylinder 1 of drive C 136, designated as P2, is the exclusive-OR of the data blocks of cylinder 1 of the other disk drives in the array 130—data block DB3 on drive A 132, data block DB4 on drive B 134, and data block DB5 on drive D 138.

Finally, the parity stored on cylinder 2 of drive B 134, designated as P2, is the exclusive-OR of the data blocks at cylinder 2 of the other disks in the array 130—data block DB6 on drive A 132, data block DB7 on drive C 136 and data block DB8 on drive D 138. This RAID 5 protocol is well known in the art.

As briefly explained above, a write operation to a RAID 5 disk array requires more time than a read operation from the same array. This is because a write operation to a RAID 5 array requires a write to both the corresponding data disk and the affected parity disk. Furthermore, before execution of either write operation, the old data's effect on the parity must first be removed by exclusive-ORing the old data with the parity. Then, the new parity is generated by exclusive-ORing the new data with the result. Once the new parity is calculated, the new parity is written to the appropriate parity location, and the new data is written to the appropriate location. In sum, a write operation in a RAID5 disk subsystem requires two reads (read the affected parity and the old data from the array) and two writes (write the new data and the new parity) to complete a single write operation requested by the operating system. For example, if the operating system requests a write with new data to DB2 on drive C 136, the hard disk controller would perform a number of operations. First, the disk controller reads the affected parity, P1 in this case, from drive D 138. Next, the hard disk controller 106 reads the old data DB2 and exclusive-ORs the old DB2 data with the old parity P1 to form an intermediate parity P1'. As well understood, this removes the effects that the original DB2 data had on the parity P1. Then the controller 106 performs the exclusive-OR of the resulting parity P1' with the new data DB2' to obtain the new parity P1''. Finally, the controller writes the new data DB2' to drive C 136, and the new parity P1'' to the drive D 138. If the number of writes approaches the number of reads in a RAID5 hard disk subsystem, a bottleneck results from the time required to complete the write operations.

This is disadvantageous, particularly considering that some writes need not be completed at all because the data changes shortly after it is written to the hard disk subsystem. For instance, the operating system may request a write to a disk address with selected data, then immediately request another write to the same disk address. In hindsight, the first write was not necessary. Therefore, postponing the actual write to the disk subsystem may eliminate the requirement to complete the write. Furthermore, it would be advantageous if the writes to the RAID 5 disk array 130, which require two reads and two writes, were postponed until a time when disk usage is at a minimum; in other words, when I/O is at a lull. If writes are postponed in this manner, the bottleneck is minimized or eliminated.

Data Logging

Data logging file systems which store files contiguously on the hard disk subsystem rather than fragmenting the files throughout a hard disk have been proposed as improved methods for storing data on a disk. Storing files subsequently on a disk is more efficient because the head does not have to seek throughout a disk to store portions of a file at various locations. However, most operating environments continue to store files in a fragmented fashion, with portions of the file located at various locations on the disk. This fragmenting results in a significant amount of time spent moving the head of the disk to new tracks on the disk (seek time), and rotating the disk until the head is over the desire data (rotational latency time). Reading or writing a single file may involve significant seek and latency times.

Unfortunately, many computer systems are tied to the conventional operating environments which do not write files sequentially on the hard disk subsystem. The present invention provides a data log for use with conventional hard disk subsystems. In the data log of the present invention, disk space is written sequentially during a write operation. Advantageously, the data log is configured at the controller level rather than the system level and is transparent to the operating system. The controller of the hard disk subsystem completes write operations requested by the operating system initially to the data log rather than directly to the hard disk subsystem.

Figure 3:
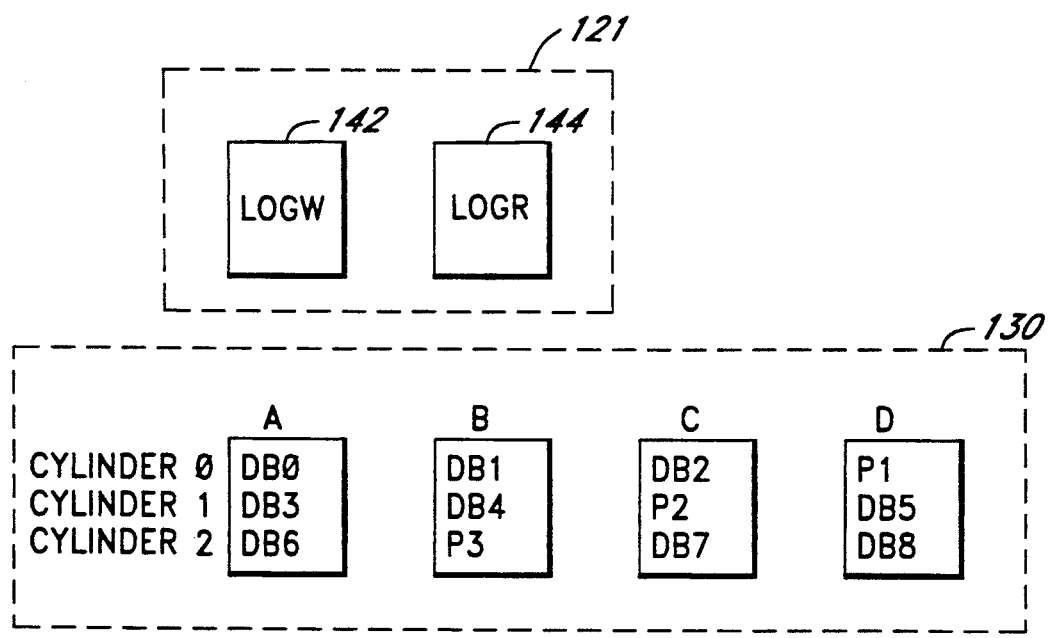
FIG. 3 illustrates a symbolic diagram of one embodiment of the data log of the present invention in a RAID 5 hard disk subsystem.

FIG. 3 illustrates a symbolic representation of the RAID 5 hard disk subsystem 130 with an embodiment of a data log 121, according to the present invention. In the embodiment depicted in FIG. 3, the data log 121 comprises two hard disks, LOGW 142 and LOGR 144. Advantageously, the LOGW 142 and LOGR 144 disks depicted in FIG. 3 comprise conventional hard disks (e.g., conventional 20-40 Megabyte hard disks from Seagate which are well known in the art). However, in other embodiments, the data log 121 may also comprise non-volatile RAM, a single hard disk, or any other non-volatile, quick-access, data storage device. Volatile RAM is less desirable because if a system crash or power failure occurs before all data in the data log is transferred to the hard disk subsystem, the data held in the data log is lost.

In a preferred embodiment, a special purpose cache may also be configured in the DRAM 112 of the hard disk controller 106 for use with the data log 121 (FIG. 1). Advantageously, the special purpose cache is transparent to the system. Providing a special purpose cache at the controller level for the data log 121, even if the system has a general purpose cache at the system level, does not result in the performance problems associated with multiple general purpose caches attempting to cache the same data.

In operation, whenever the operating system requests a write, the hard disk controller 106 (FIG. 1) stores the data, along with the destination address, in the data log 121 and returns a 'done' to the operating system. If a special purpose cache is provided for the data log 121 at the controller level, the data is also written to the cache as part of the data log 121. Once the data is written to the data log 121 and the cache, the operating system receives the 'done' from the controller 106 and may continue further operations. The controller 106 waits for a lull in I/O, and as soon as a lull is detected (i.e., no I/O requests from the operating system for a selected delay period), the hard disk subsystem controller 106 moves the blocks of data from the data log 121 or the special purpose cache to the hard disk subsystem at the appropriate destination address. For instance, if the hard disk subsystem comprises a RAID 5 disk array, the controller executes a conventional RAID 5 algorithm to transfer the data from the data log 121 or from the special purpose cache (if the cache still contains valid data) to the RAID 5 disk array.

The resulting sequence for I/O requests to the hard disk subsystem is depicted in the flow chart 150 of FIG. 4, as described in further detail below. The flow chart 150 is described in reference to a RAID 5 disk array as the hard disk subsystem 118 because of the particular usefulness of the data log 121 with a RAID disk array. However, the present invention enhances I/O with any hard disk subsystem or other data storage device. Furthermore, for discussion purposes, the data log referenced in the following discussion is the data log 121 depicted in FIG. 3 with a LOGW drive 142, a LOGR drive 144, and a special purpose cache configured in the memory 112 of the hard disk controller 106. However, the data log 121 may comprise one hard disk, non-volatile RAM, or any other quick access storage medium, as previously explained.

Figure 4:
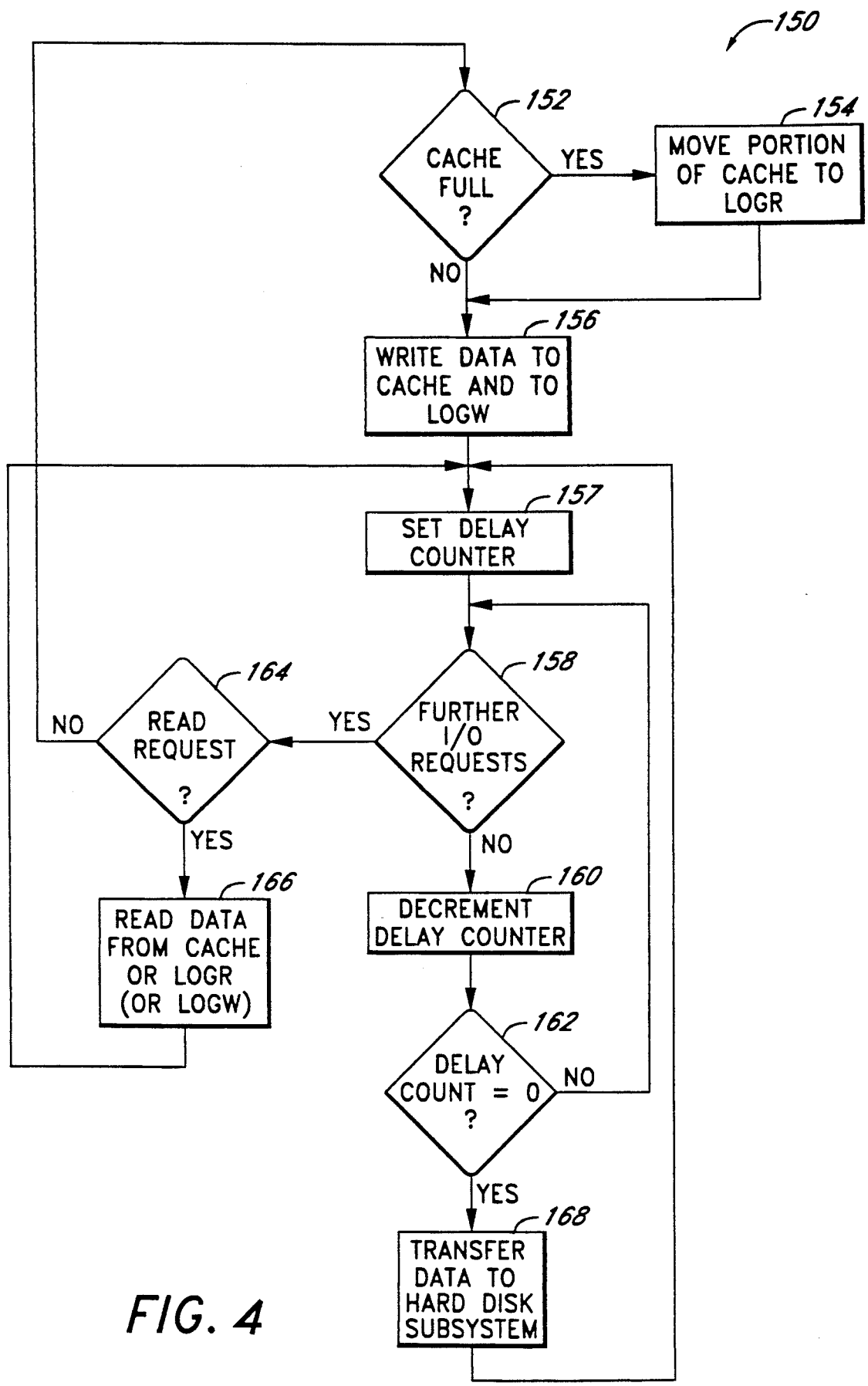
FIG. 4 depicts an exemplary flow chart for I/O requests to the hard disk subsystem using a data log with a special purpose cache according to the present invention.

As depicted in FIG. 4, when the operating system requests a write, instead of writing the data directly to the RAID 5 disk array, the hard disk controller 106 checks to see if the special purpose cache configured in the memory 112 is full, as represented in a decision block 152. If the cache is full, the hard disk controller 106 moves some of the data in the cache to the LOGR drive 144, as represented in an action block 154, and proceeds to an action block 156 where it writes (logs) the data sequentially to the special purpose cache and the LOGW drive 142. If the cache is not full (decision block 152), the hard disk controller 106 writes the data requested by the operating system to the LOGW drive 142 and the special purpose cache, as represented in the action block 156. Preferably, the address location for the destination of the data on the hard disk subsystem of the destination address is also stored along with each block of data written to the data log. In addition, each time a block of data is written to the LOGW disk 142, the address associated with the data is also stored in memory (e.g., the DRAM 112) in order to maintain a quick index of the contents of the LOGW disk 142. Similarly, the address associated with each block of data stored in the special purpose cache and in the LOGR drive 144 disk is stored in memory to provide an index for the contents of the special purpose cache and the LOGR disk 144. In one embodiment, the addresses are stored in the DRAM 112 to form indexes configured as balanced search trees or linked lists, as well understood in the art. In this manner, the hard disk controller 106 quickly determines if a particular block of data is stored in the data log by searching the indexes.

As stated, the data is written sequentially and in a linear fashion (e.g., from outside, in). In other words, the hard disk controller 106 writes the data continuously, and writes the data from each unit's request sequentially following the data from the previous request.

Once the data is written to the LOGW hard disk 142 and the special purpose cache, the hard disk controller 106 returns a 'done' to the operating system. After logging the data, the hard disk controller 106 waits for a lull in I/O requests from the operating system. In one embodiment, a lull is defined as a predetermined period (the delay period) during which the hard disk controller 106 receives no I/O requests from the operating system. This is depicted in the flow chart with an action block 157, a decision block 158, an action block 160 and a decision block 162. Specifically, the hard disk controller 106 initializes the delay period by setting a delay counter, as represented in the action block 157. Once the delay counter is initialized, the hard disk controller 106 determines if further I/O requests are pending, as represented in the decision block 158. If no further I/O requests are pending, the delay counter is decremented, as represented in the action block 160, and the delay count is checked to determine if it is zero (i.e., the delay period has expired), as represented in the decision block 162. If the delay count is not zero, then execution continues at the decision block 158, with a determination of whether further I/O requests are pending.

If the operating system requests further I/O during the delay period, the hard disk controller 106 determines if the request is a read operation, as represented in a decision block 164. If the I/O request is a write request, then the hard disk controller proceeds with execution as described beginning from the decision block 152. If the I/O request is a read request, then the hard disk controller 106 reads the requested data from the cache if the cache still has valid data, or from the LOGR drive 144 if the cache does not have valid data. Reading from the LOGW drive 142 is less preferred because the read may require moving the disk head significantly from the write position. This would decrease the advantage of the sequential write operations in the LOGW disk 142 in minimizing seek and rotational latency times.

The controller 106 determines if the cache (or alternatively, the LOGR drive 144) has the requested data by searching the index, as previously explained. If neither of these components in the data log 121 has valid data, then the hard disk controller 106 reads the requested data from the hard disk subsystem (e.g., the subsystem 118 or 119). Even if the controller reads the data from the hard disk subsystem, this does not slow down operations significantly because READ operations, even in a RAID 5 disk array, are relatively fast. Once the read is completed, the hard disk controller 106 provides the data to the operating system and continues execution at the action block 157 by initializing the delay counter. In other words, each time the operating system requests I/O, the delay period is reset, and the hard disk controller 106 begins waiting for the delay period to expire. This process continues until the hard disk controller 106 detects a lull (i.e., the delay counter times out without further I/O requests from the operating system).

When controller 106 detects a lull, it begins transferring the blocks of data from the special purpose cache (or the LOGR disk 144 if the cache no longer has valid data) to the hard disk subsystem, as represented in an action block 168. For instance, if the subsystem is a RAID 5 array, the controller 106 transfers the data using the conventional RAID 5 algorithm. Accordingly, the controller 106 uses lull time in I/O to move the data, and thereby relieves the bottleneck created by the time required to complete a I/O operations, particularly in RAID subsystems.

In the present embodiment, the transfer proceeds on a first in first out basis. The first data stored in the data log is the first to be transferred to the hard disk subsystem. When a data block is transferred from the data log to the hard disk subsystems, the corresponding address entry in the all indexes in memory is removed.

Although the flow chart 150 depicts checking for further I/O requests in the action block 158, I/O requests often generate interrupts, as well known in the art. Thus, detecting a lull may be an interrupt driven task in an alternative embodiment. In other words, a delay timer counts the delay period during which no I/O interrupts occur. If the delay period expires without an I/O interrupt occurring to the hard disk controller 106, then the hard disk controller 106 begins transferring data to the hard disk subsystem, as represented in the action block 168.

As explained above, when the hard disk controller 106 receives a read request from the operating system, the controller 106 preferably directs the read requests first to the special purpose cache on the controller 106 and then to the LOGR drive 144 if the cache does not still have the requested data. Write requests are initially directed to the LOGW drive 142 and the special purpose cache for the initial writes to the data log 121. This embodiment minimizes seek and rotational latency times in the log disks by using one disk primarily for writes, and using the cache or the other log disk for reads. However, this is only one alternative which provides significant advantages. Another embodiment for the data log 121 is non-volatile RAM. With non-volatile RAM, seek and rotational latency times (in disk drives) are not a concern. A less expensive alternative, but also less reliable, is to use one disk drive and the special purpose cache, or simply one disk drive as the data log. In this case, all writes and reads would be to the same log drive. Other embodiments for the data log of the present invention are obvious to those skilled in the art and do not detract from the subject matter regarded as invention.

Those skilled in the art will also appreciate that the use of the LOGR drive 144, as explained above, is similar to conventional 1:1 mirroring, except that a delay is introduced between the write to the LOGW drive 142 and the write to the LOGR drive 144 with the same data. The special purpose cache provides the delay. I.e., writes to the data log 121 proceed first to the LOGW drive 142 and to the special purpose cache, and data is moved from the cache to the LOGR drive 144 when the cache becomes full. This delay is advantageous because writes may become unnecessary during the delay. For instance, if the operating system requests a write, and immediately requests a write to the same location with different data, the original write is no longer valid, and the need to mirror the original write to the LOGR disk 144, as well as to move the original data to the hard disk subsystem, becomes unnecessary.

However, in an alternative embodiment, the dual disk log, is configured such that the data written to the LOGW drive 142 is mirrored directly in a 1:1 fashion onto the LOGR disk drive 144, as is well understood in the art.

If I/O requests continue without a lull, the data log may become full. In the present embodiment, if this occurs, the hard disk controller 106 simply disables data logging and executes write operations directly to the hard disk subsystem until the system I/O requests slow down somewhat. This option is not only straightforward, but also advantageous in many cases. For instance, RAID 5 performs well without data logging when the operating system is requesting extensive I/O.

A system crash may also occur while the hard disk subsystem controller 106 is waiting for a lull. In this case, the ability to determine the state of the LOGW hard disk 142 without relying on RAM enhances the reliability of the system. In one embodiment, a header for each block of data written to the data log provides information about the state of the data log. Advantageously, the header contains the starting address of the sector in the hard disk subsystem where the corresponding data belongs. The header may also include the length of the data and an ID. In a preferred embodiment, the first sector on each cylinder in the log disk is designated to contain the header for the data in that cylinder This enhances the system's ability to find the header. If a block of data is larger than one cylinder in the log drive, the length of the data, as designated in the header, allows the driver to determine where the next header is located in the data log.

In one embodiment, the ID field in the header comprises an increasing counter. Each block of data in the data log has a greater ID than the previous block of data written to the data log 121. After a system crash, the cylinders in the log drive are scanned until the ID begins decreasing. The last data block written to the data log before the crash is the data block with the highest ID before the IDs begin decreasing. In a preferred embodiment, the ID number can be any number represented by up to 64 bits of data. 64-bit IDs would not wrap around to zero until after $2^{64}$ continuous writes. The header data is not generally read from the log disks during normal operations because the same information is preferably stored in the special purpose cache.

A final advantage to the data log system is that even if a log disk crashes, the loss only degrades performance since the log disks only improve speed. If the dual log disk system is utilized, the data on one crashed log disk is not lost because it will be reflected on the other log disk.

A data logged RAID 5 hard disk subsystem would have good performance. Where a controller provides a special purpose cache, most reads are from the cache and do not involve the hard disk array. The controller directs writes to the data log and not to the hard disk subsystem until the controller detects a lull in I/O. Accordingly, the present invention provides a method and apparatus to enhance I/O performance in a computer system.

Although the preferred embodiment of the present invention has been described and illustrated above, those skilled in the art will appreciate that various changes and modifications can be made to the present invention without departing from its spirit. Accordingly, only the scope of the following appended claims limit the present invention.

What is claimed is:

1. An improved hard disk system for use in a host computer having an operating system, said system comprising:
   a hard disk subsystem having at least two hard disks;
   a hard disk controller; and
   a data log which temporarily stores data from consecutive write operations directed to the hard disk subsystem, wherein the hard disk controller accepts data from the host computer to be written to both contiguous and non-contiguous disk addresses on the hard disk subsystem, and stores said data in the data log sequentially in the order in which the data re received, and wherein the data are later moved from the data log to the appropriate disk addresses within the hard disk subsystem.

2. The hard disk subsystem of claim 1, wherein in the conventional hard disk subsystem comprises a RAID 4 disk array.

3. The hard disk system of claim 1, wherein the conventional hard disk subsystem comprises a RAID 5 disk array.

4. The hard disk system of claim 1, wherein the data log comprises a single hard disk.

5. The hard disk subsystem of claim 1, wherein the data log comprises non-volatile random access memory.

6. The hard disk system of claim 1, wherein the data log comprises a first hard disk and a second hard disk, wherein the second hard disk provides mirroring for the first hard disk.

7. The hard disk system of claim 1, wherein the data log comprises a first hard disk, a second hard disk, and a special purpose cache configured in a memory of the hard disk controller, and wherein the second hard disk provides delayed mirroring for the first hard disk.

8. The hard disk system of claim 1, wherein the data are moved form the data log to the appropriate disk addresses within the hard disk subsystem by the hard disk controller when the hard disk controller detects a lull in input/output requests from the host computer.

9. An improved hard disk system for use in a host computer, said system comprising:
   a hard disk controller which monitors the frequency of occurrence of data input/output requests by an operating system;
   a conventional hard disk subsystem with at least two hard disks; and
   a data log which temporarily stores data for the conventional hard disk subsystem, wherein the hard disk controller stores data in the data log sequentially and linearly, and wherein the data in the data log is transferred to the conventional hard disk subsystem upon a decrease in the frequency of occurrence of input/output requests from the operating system.

10. An improved hard disk system for use in a computer having an operating system, said system comprising:
   a hard disk controller which monitors the frequency of occurrence of data input/output requests by the operating system;
   a hard disk subsystem having at least two hard disks controlled by the hard disk controller; and
   a data log controlled by the hard disk controller which temporarily stores data from consecutive write operations directed by the operating system to the hard disk subsystem, wherein the data is later transferred from the data log to the hard disk subsystem when the hard disk controller determines that the frequency of occurrence of input/output requests from the operating system has decreased, and wherein the data is stored in the data log sequentially in the order received by the operating system.

11. A method of temporarily logging data intended for a conventional hard disk array onto a data log, wherein the conventional hard disk array is used in a computer with a conventional operating system, said conventional hard disk array and said data log being controlled by a hard disk controller, said method comprising the steps of:
   receiving a request from the operating system to the hard disk controller to write data to the conventional hard disk array, said data directed to contiguous and non-contiguous disk addresses of the hard disk array;
   sequentially writing the data to the data log and indicating to the operating system that the write is complete;
   waiting for a decrease in the frequency of occurrence of read and write requests by the operating system; and transferring the data from the data log to the conventional hard disk array.

12. The method of claim 11, wherein the step of writing the data to the data log further comprises the steps of:
   writing the data to a special purpose cache configured in a memory on the hard disk controller; and
   writing the data to a first hard disk drive in the data log.

13. The method of claim 11, wherein the hard disk controller has a special purpose cache configured in a memory, said step of writing the data to the data log further comprising the steps of:
   writing the data to a first hard disk drive in the data log;
   determining if the special purpose cache is full, and, if the cache is full, moving a selected portion of the data from the cache to a second hard disk drive in the data log; and
   writing the data to the cache.

* * * * *

UNITED STATES PATENT AND TRADEMARK OFFICE
CERTIFICATE OF CORRECTION

PATENT NO.   : 5,297,258
DATED        : March 22, 1994
INVENTOR(S)  : Robert P. Hale and Robert J. Beard It is certified that error appears in the above-indentified patent and that said Letters Patent is hereby corrected as shown below:

Claim 1, column 11, line 58, please change "re received" to --are received --.

Claim 8, column 12, line 13, please change "form" to --from --.

Signed and Sealed this

Tenth Day of January, 1995

Attest:

BRUCE LEHMAN

*Attesting Officer*    *Commissioner of Patents and Trademarks*